(12) United States Patent
Singh et al.

(10) Patent No.: US 11,900,100 B2
(45) Date of Patent: *Feb. 13, 2024

(54) SYSTEM AND METHOD FOR ENABLING A ROLLBACK MECHANISM FOR SHARED DEVICES IN AN INFORMATION HANDLING SYSTEM

(71) Applicant: DELL PRODUCTS L.P., Round Rock, TX (US)

(72) Inventors: Amit Pratap Singh, Bangalore (IN); Vivek Sundaresan, Bangalore (IN); Raveendra Babu Madala, Bangalore (IN); Santosh Gore, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/875,191

(22) Filed: Jul. 27, 2022

(65) Prior Publication Data

US 2022/0365769 A1    Nov. 17, 2022

Related U.S. Application Data

(63) Continuation of application No. 17/022,920, filed on Sep. 16, 2020, now Pat. No. 11,467,819.

(51) Int. Cl.
 *G06F 8/65* (2018.01)
 *G06F 3/06* (2006.01)

(52) U.S. Cl.
 CPC ............ *G06F 8/65* (2013.01); *G06F 3/065* (2013.01); *G06F 3/0619* (2013.01); *G06F 3/0683* (2013.01)

(58) Field of Classification Search
 CPC ..................................................... G06F 8/65
 See application file for complete search history.

(56) References Cited

U.S. PATENT DOCUMENTS

| 8,429,640 | B2 | 4/2013 | Yin et al. |
| 9,734,191 | B2 | 8/2017 | Swierk et al. |
| 2012/0117555 | A1 | 5/2012 | Banerjee et al. |
| 2013/0055155 | A1 | 2/2013 | Wong et al. |
| 2013/0227543 | A1 | 8/2013 | Chen |
| 2018/0314511 | A1* | 11/2018 | Butcher .................. G06F 8/654 |

* cited by examiner

*Primary Examiner* — Duy Khuong T Nguyen
(74) *Attorney, Agent, or Firm* — Larson Newman, LLP (57) ABSTRACT

An information handling system includes a shared device, first and second compute nodes, and a chassis management controller. The first compute node includes a first management controller, which initiates a firmware update for firmware in the shared device. The first management controller detects that that the firmware update is complete. In response to the firmware update being completed, the management controller sends rollback information for the firmware to the chassis controller. The chassis controller stores the rollback information as a rollback image within a storage location of a memory. The chassis controller further sends the rollback information to the second compute node. The second compute node includes a second management controller, which in turn receives the rollback information from the chassis controller, and updates the rollback information within the second compute node.

20 Claims, 4 Drawing Sheets

SYSTEM AND METHOD FOR ENABLING A ROLLBACK MECHANISM FOR SHARED DEVICES IN AN INFORMATION HANDLING SYSTEM

CROSS-REFERENCE TO RELATED APPLICATION

This application is a Continuation of U.S. patent application Ser. No. 17/022,920 entitled "SYSTEM AND METHOD FOR ENABLING A ROLLBACK MECHANISM FOR SHARED DEVICES IN AN INFORMATION HANDLING SYSTEM," filed Sep. 16, 2020, the disclosure of which is hereby expressly incorporated by reference in its entirety.

FIELD OF THE DISCLOSURE

The present disclosure generally relates to information handling systems, and more particularly relates to enabling a rollback mechanism for shared devices in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a shared device, first and second compute nodes, and a chassis management controller. The first compute node includes a first management controller, which may initiate a firmware update for firmware in the shared device. The first management controller may detect that that the firmware update is complete. In response to the firmware update being completed, the management controller may send rollback information for the firmware to the chassis controller. The chassis controller may store the rollback information as a rollback image within a storage location of a memory. The chassis controller may further send the rollback information to the second compute node. The second compute node includes a second management controller, which in turn may receive the rollback information from the chassis controller and update the rollback information within the second compute node.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
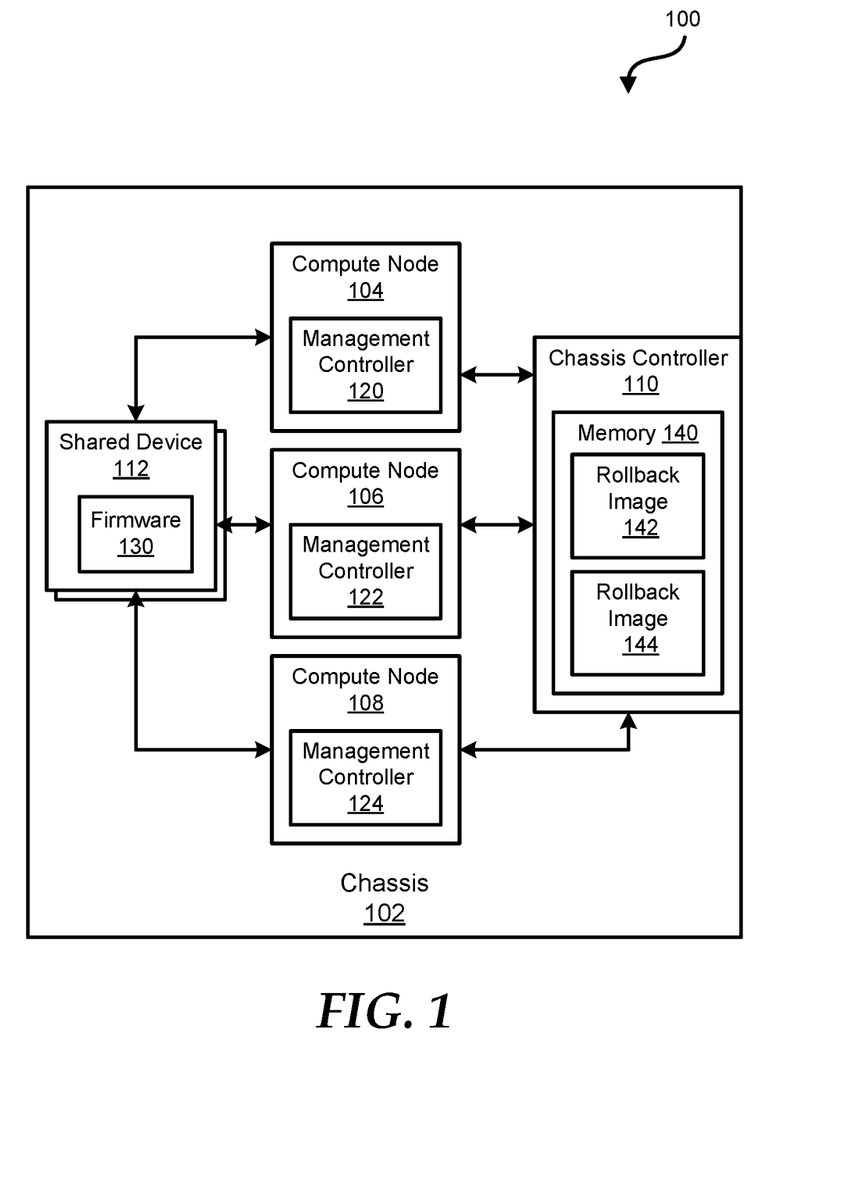
FIG. 1 is a block diagram of a portion of an information handling system according to at least one embodiment of the disclosure.

FIG. 1 shows a portion of an information handling system 100 including chassis 102. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Chassis 102 includes compute nodes 104, 106, and 108, a chassis controller 110, and one or more shared devices 112. In an example, information handling system 100 may be any suitable system including, but not limited to, a converged infrastructure system. In certain examples, compute nodes 104, 106, and 108 may all have access to shared devices 112. Each shared device 112 may be any suitable device including, but not limited to, memory drives, memory controller, and a redundant array of independent disks (RAID) controller. Each compute node 104, 106, and 108 may include a manage controller to communicate with chassis controller 110. For example, compute node 104 includes memory controller 120, compute node 106 includes memory controller 122, and compute node 108 includes memory controller 124. In certain examples, information handling system 100 may include additional components over those shown in FIG. 1 without varying from the scope of this disclosure.

In an example, each management controller 120, 122, and 124 may be any suitable type of controller including, but not limited to, a baseboard management controller. That is, each compute node may have a motherboard comprising a chipset. As those of ordinary skill in the art understand, each management controller 120, 122, and 124 may have its own management processor and memory device, not shown for simplicity, that interfaces with the motherboard to provide side-band and out-of-band remote management. Each management controller 120, 122, and 124 may also have one or more physical communications links and interfaces to the motherboard of its respective computer node 104, 106, and 108, thus allowing the management controller to process messages according to any suitable specification. For example, the communication specification for management controller 120, 122, and 124 may be the Intelligent Platform Management Interface (IPMI) specification. Each management controller 120, 122, and 124 may thus monitor and remotely report the functions and performance of the corresponding compute node 104, 106, or 108 via a separate network interface to a communications network. Management controllers 120, 122, and 124, such as baseboard management controllers, and the IPMI specification are generally well known and thus need not be explained in detail.

In an example, chassis management controller 110 may control or manage the individual and/or overall hardware and software resources within chassis 102. While chassis management controller 110 may have any physical location, FIG. 1 illustrates the chassis management controller accessible via a rear of chassis 102. In certain examples, individual computer nodes 104, 106, and 108 may communicate, via respective management controllers 120, 122, and 124, with chassis management controller 110. In an example, the communication may be via any suitable interface including, but not limited to, I/O interfaces, such as ISA, SCSI, I²C, SPI, single wire, Ethernet, and/or USB.

During operation of computer nodes 104, 106, and 108, each compute node may treat shared devices 112 assigned to it as native device even though these devices are shared with other compute node(s) within chassis 102. As part of device management, each compute node 104, 106, and 108 manages firmware 130 of these devices 112. Each compute node 104, 106, and 108 maintains its own rollback information for shared devices 112. In an example, the rollback partition on a compute node 104, 106, or 108 might become stale if shared device 112 is updated from another compute node. Compute nodes 104, 106, and 108 of information handling system 100 may be improved by providing a firmware rollback mechanism within chassis 102 to prevent the rollback image for shared device 112 from becoming stale on any one of the compute nodes.

During an update of firmware 130 of shared device 112, compute nodes 104, 1067, and 108 may perform one or more operations to maintain a proper rollback image for the firmware. For example, interfaces and/or applications executed on a particular compute node, such as compute node 104, may provide or handover a rollback image to its management controller, such as management controller 120. In response to receiving the rollback image, management controller 120 may identify or detect that the rollback image is for firmware 130 of shared device 112, which in turn is shared by all computer nodes 104, 106, and 108.

Upon the detection that the rollback image is for shared device 112, management controller may hand off or transmit the rollback image and corresponding information to chassis controller 110. In an example, chassis controller 110 may utilize memory 140 to store one or more rollback images, such as rollback images 142, and 144, for firmware 130. Chassis controller 110 may store the current rollback image in a different memory location of memory 140 than a previous rollback image. For example, chassis controller 110 may store rollback image 144 in a new memory location of memory 140 while maintaining a previous rollback image 142 within the memory. Management controller 120 may receive information indicating the memory location of rollback image 144, and update the logical link for the rollback image of firmware 130.

In an example, chassis controller 110 may then perform one or more suitable operations to update the logical links of the other compute nodes utilizing shared device 112. For example, chassis controller 110 may provide information indicating the memory location of rollback image 144 to management controllers 122 and 1234. Each of management controllers 122 and 124 may then update their respective logical links to point the most recent rollback image, such as rollback image 144 in memory 140 of chassis controller 110.

Whenever a compute node, such as compute node 108, tries to perform a rollback of firmware 130 on shared device 112, management controller 124 may fetch rollback image 144 from chassis controller 110 and perform rollback. In response to successfully performing the rollback, management controller 124 may inform chassis controller 110 for updating the rollback information in the other compute nodes, such as compute nodes 104 and 106, in a similar manner as described above.

Figure 2:
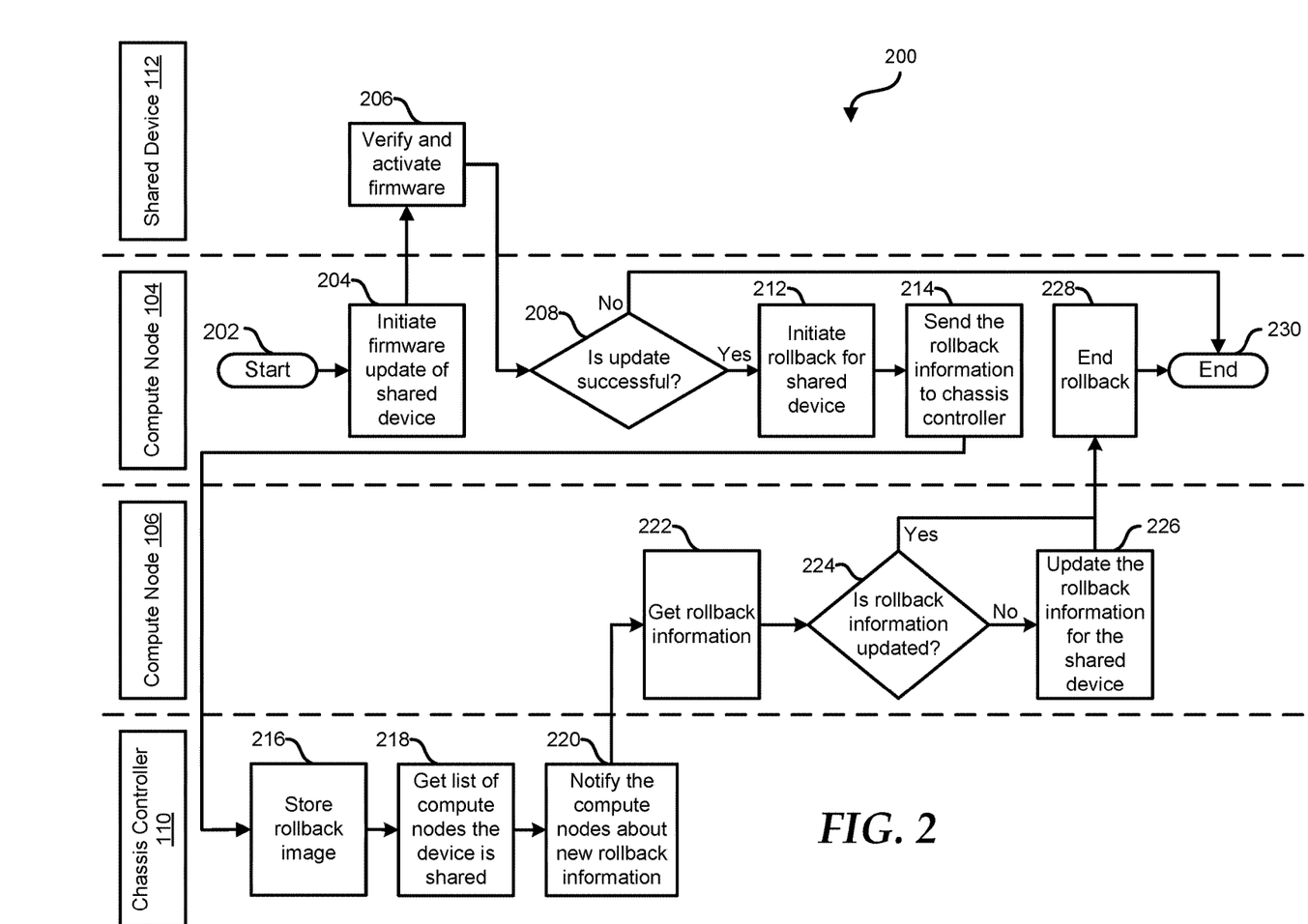
FIG. 2 is a diagram illustrating an operational flow in the portion of the information handling system according to at least one embodiment of the present disclosure.

FIG. 2 shows an operational flow 200 for enabling a rollback mechanism for shared device 112 by chassis controller 110 and compute nodes 104 and 106 in an information handling system according to at least one embodiment of the present disclosure, starting at block 202. It will be readily appreciated that not every method step set forth in this flow diagram is always necessary, and that certain steps of the methods may be combined, performed simultaneously, in a different order, or perhaps omitted, without varying from the scope of the disclosure. FIG. 2 may be employed in whole, or in part, by information handling system 100 depicted in FIG. 1 or any other type of system, controller, device, module, processor, or any combination thereof, operable to employ all, or portions of, the method of FIG. 2.

At block 204, compute node 104 may initiate a firmware update of a shared device. In an example, compute node 104 may receive the firmware update from any suitable location including, but not limited to, an update package in a firmware catalog managed by a manufacturer and IT manager of an information handling system. As part of initiating the firmware update, compute node 104 may provide the firmware to shared device 112.

At block 206, shared device 112 may verify and activate the firmware. In an example, shared device 112 may perform the verification and activation based on information associated with the firmware received from compute node 104. At block 208, compute node 104 may determine whether the firmware update was successful. In an example, shared device 112 may provide compute node 104 with any suitable information indicating an outcome of the firmware update process. If the firmware update is not successful, compute node 104 may end operations at block 210.

If the firmware update is successful, compute node 104 may initiate a rollback for shared device 112. In certain examples, the rollback information may be any suitable information indicating a previous firmware version including, but not limited to, a rollback image of the firmware. At block 214, compute node 104 may send the rollback information to chassis controller 110. At block 216, chassis controller 110 may store a rollback image in a memory of the chassis controller. In an example, the rollback image may be stored in any suitable location of the memory including, but not limited to, a new location other than memory location of a previous rollback image. In this example, chassis controller 110 may preserve the previous rollback image for situations where more than one rollback of the firmware is needed.

At block 218, chassis controller 110 may get or compile a list of all compute nodes that utilize shared device 112. At block 220, chassis controller 110 may provide a notification the one or more compute nodes, such as compute nodes 104 and 106, with rollback information for the firmware of shared device 112. The compute nodes may perform one or more suitable operations to update the rollback information. For example, compute node 106 may get the rollback information from chassis controller 110 at block 222. At block 224, compute node 106 may determine whether the rollback information is already updated within the compute node. For example, if compute node 106 was the node that initiated the firmware update, the compute node would already have the updated rollback information.

If the rollback information is not already updated within compute node 106, the compute node may update the rollback information for shared device 112 at block 226, and the flow continues at block 228. In an example, compute node 106 may update the rollback information by performing one or more suitable operations including, but not limited to, updating a logical link for the rollback image to point to the storage location of the rollback information within the memory of chassis controller 110. If, at block 224, the rollback information is already updated within compute node 106, the compute node does not perform any more operations and the flow continues at block 228. At block 228, compute node 104 may end the rollback operations for the firmware of shared device 112, and the flow ends at block 230.

While operational flow 200 of FIG. 2 was described with respect to two compute nodes 104 and 106, one of ordinary skill in the art would recognize that this operational flow may be utilized for a device shared between more than two compute nodes without varying from the scope of this disclosure.

Figure 3:
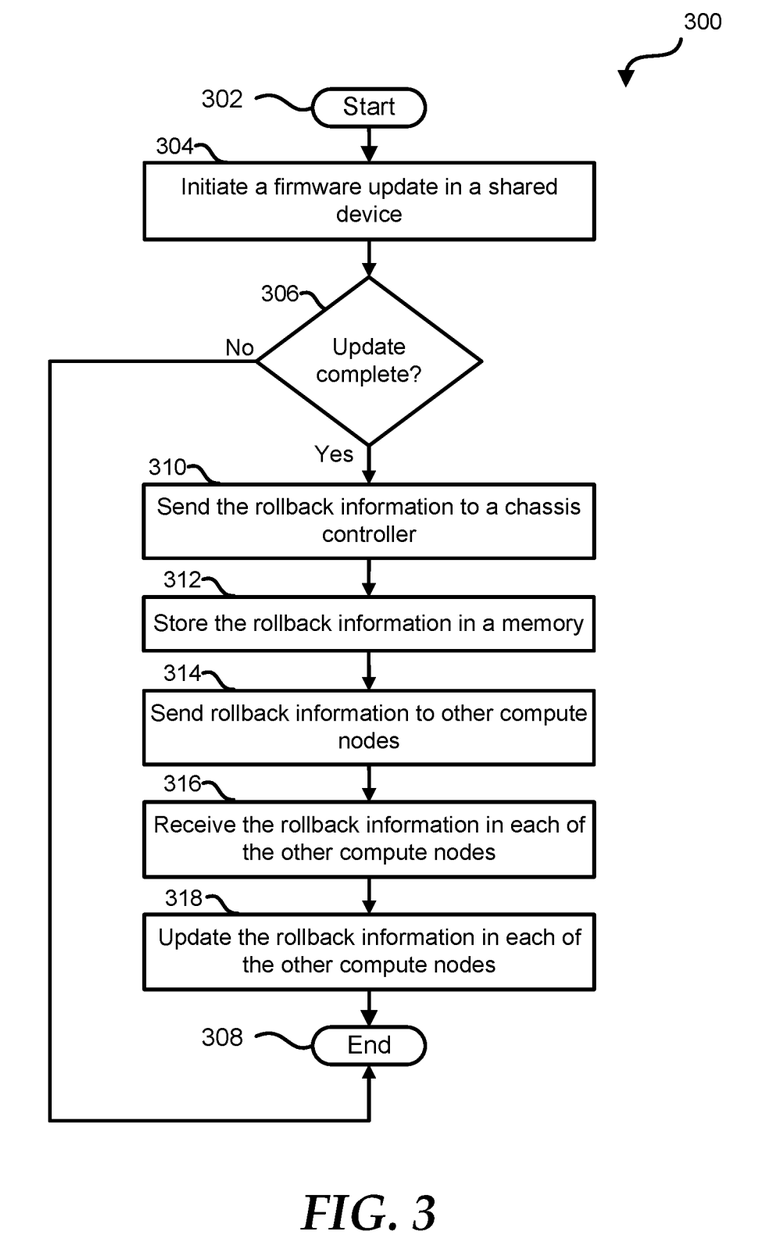
FIG. 3 is a flow diagram of a method for enabling a rollback mechanism for shared devices in an information handling system according to at least one embodiment of the present disclosure.

FIG. 3 shows a flow diagram of a method 300 for enabling a rollback mechanism for shared devices in an information handling system according to at least one embodiment of the present disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1 or any other type of system, controller, device, module, processor, or any combination thereof, operable to employ all, or portions of, the method of FIG. 3.

At block 304, a firmware update of a shared device may be initiated. In an example, the firmware update may be initiated by any suitable component within an information handling system including, but not limited to, a compute node. In certain examples, the firmware update may be received from any suitable location including, but not limited to, an update package in a firmware catalog managed by a manufacturer and IT manager of an information handling system.

At block 306, determination is made whether the firmware update was successful. In an example, a shared device may provide any suitable information indicating an outcome of the firmware update process. If the firmware update is not successful, the flow ends at block 308. If the firmware update is successful, rollback information for the firmware of the shared device is sent to a chassis controller at block 310. In certain examples, the rollback information may be any suitable information indicating a previous firmware version including, but not limited to, a rollback image of the firmware.

At block 312, the rollback information is stored in a memory of the chassis controller. In certain examples, the rollback information may be stored in any suitable format including, but not limited to, a rollback image. In an example, the rollback image may be stored in any suitable location of the memory including, but not limited to, a new location other than a memory location of a previous rollback image. In this example, the chassis controller may preserve the previous rollback image for situations where more than one rollback of the firmware is needed.

At block 314, the rollback information for the firmware of shared device is sent to other compute nodes of the information handling system. In an example, the other compute nodes may be one or more compute nodes other than the compute node that initiated the firmware update. At block 316, the rollback information is received at the other compute nodes. At block 318, the rollback information is updated on each of the other compute nodes, and the method ends at block 308. In an example, a compute node may update the rollback information by performing one or more suitable operations including, but not limited to, updating a logical link for the rollback image to point to the storage location of the rollback information within the memory of chassis controller.

Figure 4:
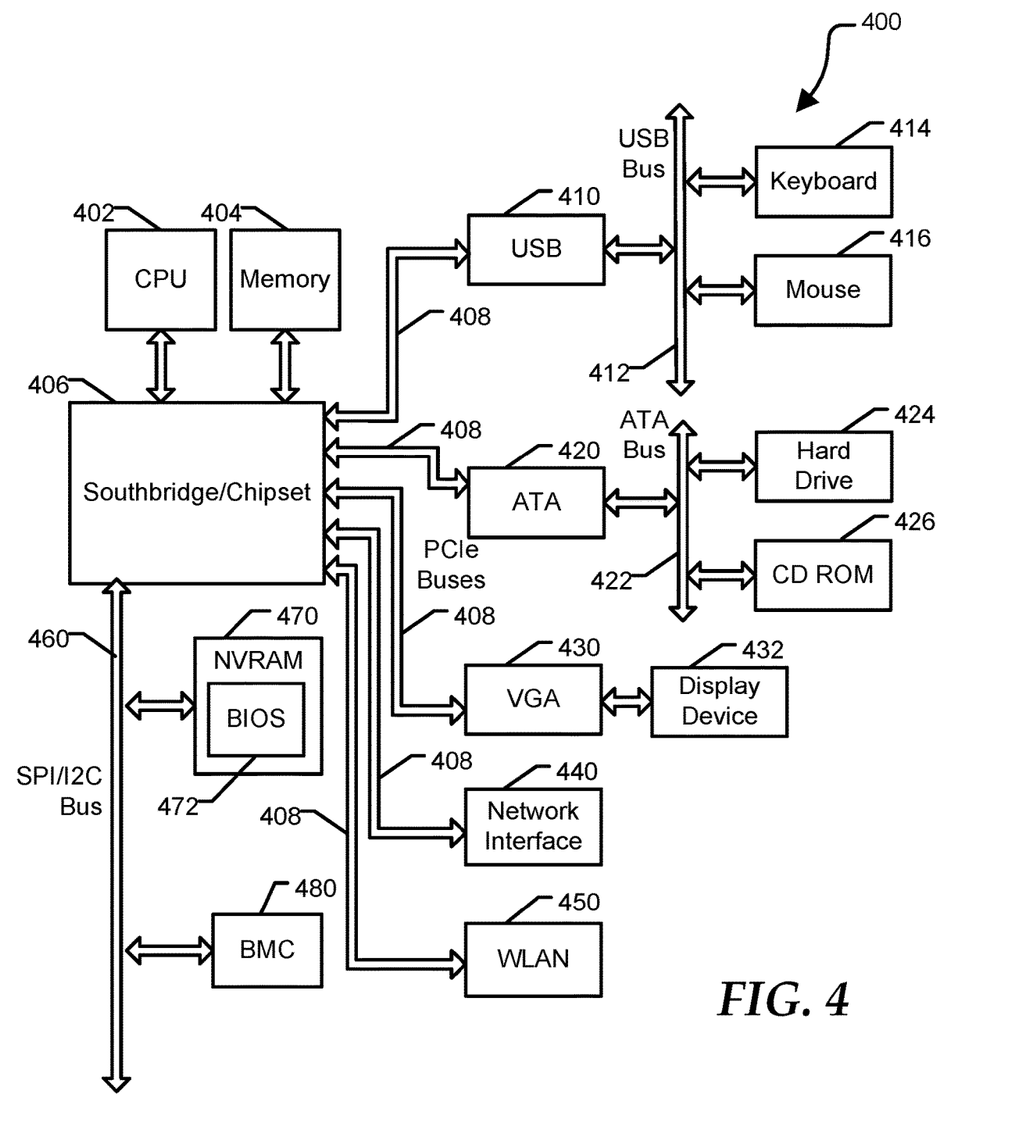
FIG. 4 is a block diagram of a general information handling system according to an embodiment of the present disclosure.

FIG. 4 illustrates a general information handling system 400 including a processor 402, a memory 404, a southbridge/chipset 406, one or more PCIe buses 408, a universal serial bus (USB) controller 410, a USB 412, a keyboard device controller 414, a mouse device controller 416, a configuration an ATA bus controller 420, an ATA bus 422, a hard drive device controller 424, a compact disk read only memory (CD ROM) device controller 426, a video graphics array (VGA) device controller 430, a network interface controller (NIC) 440, a wireless local area network (WLAN) controller 450, a serial peripheral interface (SPI) bus 460, a NVRAM 470 for storing BIOS 472, and a baseboard management controller (BMC) 480. In an example, chipset 406 may be directly connected to an individual end point via a PCIe root port within the chipset and a point-to-point topology as shown in FIG. 4. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of southbridge/chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 400 may be any suitable device including, but not limited to, compute nodes 104, 106, and 108 of FIG. 1. Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In a particular embodiment, the instructions may reside completely, or at least partially, within system memory 404 or another memory included at system 400, and/or within the processor 402 during execution by the information handling system 400. The system memory 404 and the processor 402 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   initiating, by a first management controller of a first compute node in an information handling system, a firmware update for firmware in a shared device of the information handling system, wherein the shared device is utilized by the first compute node and a second compute node;
   detecting, by the first management controller, that the firmware update is complete;
   in response to the firmware update being completed, sending rollback information for the firmware to a chassis controller of the information handling system; and
   in response to reception of the rollback information, storing, by the chassis controller, the rollback information as a rollback image within a memory in the chassis controller.

2. The method of claim 1, wherein the initiating of the firmware update includes providing, by the first management controller, the firmware update to the shared device.

3. The method of claim 2, further comprising:
   receiving, by the shared device, the firmware update from the first management controller;
   verifying and activating, by the shared device, the firmware; and
   transmitting, by the shared device, an update successful signal for the firmware update to the first management controller.

4. The method of claim 1, further comprising:
   in response to the rollback information being stored within a storage location of the memory, retrieving, by the chassis controller, a list of compute nodes utilizing the shared device, wherein the first and second compute nodes are included in the list; and
   providing the rollback information to all compute nodes on the list.

5. The method of claim 4, wherein the storage location of the memory is a different location of the memory than a second storage location where a previous rollback image of the firmware is stored.

6. The method of claim 5, wherein the updating of the rollback information within the second compute node further includes updating, by the second management controller, a logical link from the second storage location to the storage location for the rollback information.

7. The method of claim 1, wherein the rollback image is only stored in the memory of the chassis controller, and the first and second compute nodes store a logical link pointing to the storage location.

8. An information handling system comprising:
   a shared device utilized by first and second compute nodes within the information handling system; and
   a chassis controller including a memory;
   the first compute node to communicate with the shared device and with the chassis controller, the first compute node including a first management controller to:
      initiate a firmware update for firmware in the shared device;
      detect that the firmware update is complete; and
      in response to the firmware update being completed, send rollback information for the firmware to the chassis controller; and
   in response to reception of the rollback information, the chassis controller to:
      store the rollback information as a rollback image within a storage location of the memory.

9. The information handling system of claim 8, wherein the initiating of the firmware update includes the first management controller to provide the firmware update to the shared device.

10. The information handling system of claim 9, wherein the shared device to:
    receive the firmware update from the first management controller;
    verify and activate the firmware; and
    transmit an update successful signal for the firmware update to the first management controller.

11. The information handling system of claim 8, wherein the chassis controller further to:
    in response to the rollback information being stored within the storage location, retrieve a list of compute nodes utilizing the shared device, wherein the first and second compute nodes are included on the list; and
    provide the rollback information to all compute nodes on the list.

12. The information handling system of claim 8, wherein the storage location of the memory is a different location of the memory as compared to a second storage location where a previous rollback image of the firmware is stored.

13. The information handling system of claim 8, wherein the updating of the rollback information within the second compute node further includes, the second management controller to update a logical link from the second storage location to the storage location for the rollback information.

14. The information handling system of claim 8, wherein the rollback image is only stored in the memory of the chassis controller, and the first and second compute nodes store a logical link pointing to the storage location.

15. A non-transitory computer-readable medium including code that when executed performs a method, the method comprising:

initiating, by a first management controller of a first compute node in an information handling system, a firmware update for firmware in a shared device of the information handling system, wherein the shared device is utilized by the first compute node and a second compute node;

when the firmware update is complete, sending rollback information for the firmware to a chassis controller of the information handling system; and     storing, by the chassis controller, the rollback information as a rollback image within a storage location of a memory in the chassis controller.

16. The non-transitory computer-readable medium of claim 15, wherein the initiating of the firmware update further includes:

providing, by the first management controller, the firmware update to the shared device.

17. The non-transitory computer-readable medium of claim 15, wherein the method further comprises:

receiving, by the shared device, the firmware update from the first management controller;

verifying and activating, by the shared device, the firmware; and     transmitting, by the shared device, an update successful signal for the firmware update to the first management controller.

18. The non-transitory computer-readable medium of claim 15, wherein the method further comprises:

in response to the rollback information being stored within the storage location, retrieving, by the chassis controller, a list of compute nodes utilizing the shared device, wherein the first and second compute nodes are included in the list; and     providing the rollback information to all compute nodes on the list.

19. The non-transitory computer-readable medium of claim 15, wherein the storage location of the memory is a different location of the memory as compared to a second storage location where a previous rollback image of the firmware is stored.

20. The non-transitory computer-readable medium of claim 15, wherein the updating of the rollback information within the second compute node further includes:

updating, by the second management controller, a logical link from the second storage location to the storage location for the rollback information.

\* \* \* \* \*